June 9, 1964 J. F. McAULIFFE ETAL 3,136,561
COLLET FOR FLUTED SHANKLESS TOOL
Filed April 23, 1963 2 Sheets-Sheet 1
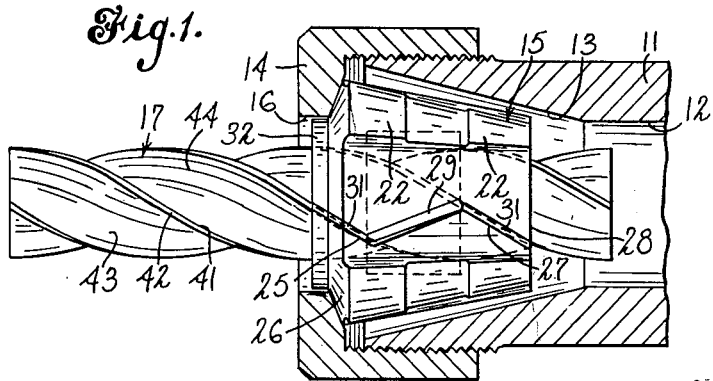
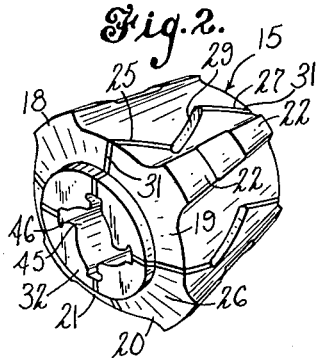
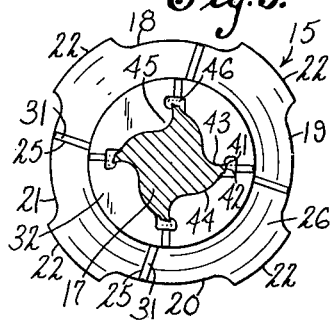
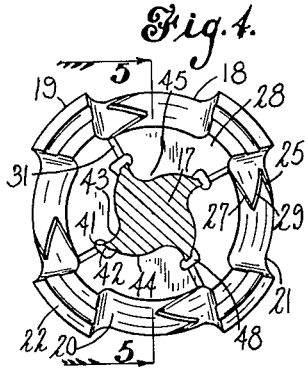
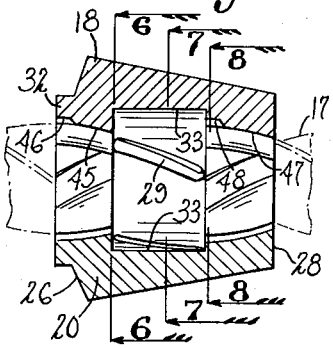
INVENTORS
John F. McAuliffe
Anthony D. Parone
BY Spencer, Rockwell & Bartholow
ATTORNEYS June 9, 1964 J. F. McAULIFFE ETAL 3,136,561
COLLET FOR FLUTED SHANKLESS TOOL
Filed April 23, 1963 2 Sheets-Sheet 2

INVENTORS
John F. McAuliffe
Anthony D. Parone
BY Spencer, Rockwell & Bartholow
ATTORNEYS United States Patent Office 3,136,561
Patented June 9, 1964

3,136,561
COLLET FOR FLUTED SHANKLESS TOOL
John F. McAuliffe, Farmington, and Anthony D. Parone, Elmwood, Conn., assignors to Pratt & Whitney Company, Incorporated, West Hartford, Conn.
Filed Apr. 23, 1963, Ser. No. 275,155
10 Claims. (Cl. 279—9)

This invention relates to fluted shankless tools and more particularly relates to a collet capable of supporting and securely gripping a shankless cutting tool in such a manner that rotational and axial movement of the tool with relation to the collet is prevented. More particularly, the invention relates to a collet which grips the cutting tool along the flutes thereof, thereby eliminating the need for a shank on the fluted tool.

The majority of fluted cutting tools, such as drills, mills, reamers and the like, are provided with shanks. Shanks having a straight or tapered configuration are the most common and the only purpose which these shanks serve is to support and grip the cutting tool. The formation of a shank at the end of a fluted tool increases the cost of producing the tool without providing an advantage commensurate with the increased cost, and if the shank breaks off the tool, the tool becomes useless and must be discarded. In gripping a tool which is to be fed in an axial direction, one of the primary considerations is that the gripping member holds the tool with sufficient force to prevent slipping of the tool relative to the holder during the cutting operation.

Accordingly, an object of this invention is to provide an improved tool holder which will securely grip a fluted shankless tool along the flutes thereof, providing maximum security against slippage of the tool relative to the tool holder.

Another object of the invention is to provide a tool holder which will securely grip a fluted shankless tool without damaging the cutting edges thereof.

Still another object of the invention is to provide a tool holder for a fluted shankless tool which will securely grip the tool along the flute thereof regardless of flute contours, high spots and the like.

A further object of the invention is to provide a tool holder comprising a plurality of projecting surfaces, the tool holder being so constructed and arranged that the projections may move relative to one another to provide maximum contact with the flutes of the tool.

A still further object of the invention is to provide a tool holder having a plurality of spaced-apart bearing surfaces which will contact the flutes of a tool to securely grip the tool regardless of flute contours, high spots and the like.

Still other objects and advantages of the invention will in part be obvious and will in part be apparent from the specification.

Generally speaking, in accordance with the invention, a collet is formed having a plurality of sections which may be deflected relative to one another. The collet is adapted to be encircled by a holder which causes inward deflections of the sections to tightly grip a tool which the collet encircles. More specifically, the invention contemplates the utilization of spaced-apart bearing or contact surfaces on each section so that at least two points of contact will be provided between each section and the flutes of the tool along the flutes thereof. Adjacent sections may be divided along axially-extending cuts which leave a web of metal adjoining adjacent sections or the sections may be separated into segments which are resiliently bonded together so that the segments may be deflected relative to one another. In either form of construction, the permissible relative movement between the sections assures a large number of contact points between the collet and the tool. A collet constructed in accordance with the invention will have at least twice as many points of contact between the collet and the tool as there are sections.

The invention accordingly comprises the features of construction, combination of elements, and arrangement of parts which will be exemplified in the construction hereinafter set forth and the scope of the invention will be indicated in the claims.

For a fuller understanding of the invention, reference is had to the following description taken in connection with the accompanying drawing, in which:

FIG. 1 is a longitudinal view, partly in section, of a preferred embodiment of the invention showing a four-fluted end mill supported in a sleeve having a tapered bore;

FIG. 2 is a perspective view of a collet constructed in accordance with a preferred embodiment of the invention;

FIG. 3 is a front elevational view of the collet of FIG. 2;

FIG. 4 is a rear elevational view of the collet of FIG. 2;

FIG. 5 is a sectional view taken along line 5—5 of FIG. 4;

Figure 6:
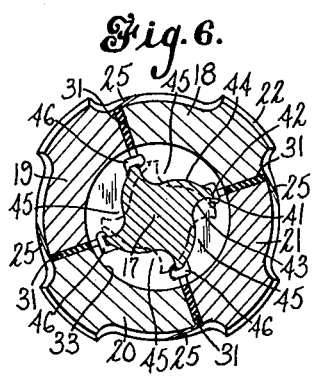
FIG. 6 is a sectional view taken along line 6—6 of FIG. 5.
Figure 7:
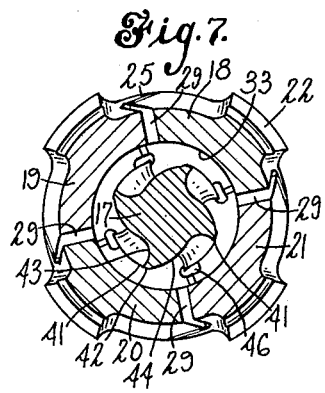
FIG. 7 is a sectional view taken along line 7—7 of FIG. 5.

In order to provide a complete and accurate disclosure in the preferred embodiments of the invention shown in the drawings and described herein, the tool holder or collet is adapted to receive and grip an end mill having four flutes. However, it should be understood that the invention herein is not limited for use with an end mill or for use with a four-fluted tool. The tool holder could be used, for example, for gripping a shankless drill having two flutes or any other tool having any number of flutes. The preferred embodiments also show the collet having tapered exterior walls adapted to be received in a tapered bore which will inwardly deflect the collet sections as the collet is urged into the bore. The outside configuration of the collet is not critical and any outside configuration may be utilized. For instance, the exterior walls could be parallel giving the collet the overall shape of a cylinder, or it could have a plurality of flat sides giving it a polygonal configuration. The outside configuration of the collet will be dictated by the configuration of the means provided to hold the collet. Such means form no part of the invention herein.

Referring now to FIG. 1, a sleeve 11 is shown having a cylindrical bore 12 and a tapered bore 13 which tapers outwardly from the cylindrical bore to the end face of the sleeve. By way of example, the sleeve may be the spindle of a boring mill or other machine tool. A collar 14 threadedly engages the sleeve to secure a collet, indicated generally at 15, in the tapered bore. Collar 14 is provided with a central bore through which a tool 17 projects. The bore may also cooperate with the collet to align it in the tapered bore. The combination of the collar 14 and the sleeve 11 are of a well-known type and are used to urge a cone-shaped collet into the tapered bore to compress the collet radially inwardly as the collet is forced further into the tapered bore. Instead of the collet gripping a shank of the tool, the collet described herein is adapted to engage and grip the tool by means of the flutes so that no shank is required on the tool.

The details of a preferred embodiment of the collet are shown in FIGS. 2 through 8, wherein it is apparent that the outer circumferential surface of the collet is tapered to be received in tapered bore 13. As shown, the collet is adapted to receive a four-fluted tool and, thus, the collet is composed of four main sections or segments, 18, 19, 20 and 21. In order to insure that the conically-shaped periphery of each segment will contact the walls of the tapered bore, each segment is provided with tapered or conically-shaped bearing surfaces 22 which extend outwardly from the periphery of each segment. The segments are split longitudinally to divide the collet into four segments. While the direction of split is not deemed critical, it has been found advantageous, according to a preferred embodiment of the invention, to split adjacent segments along a first line 25 which extends from the front face 26 of the collet approximately parallel to the rake angle of the flutes of the particular cutting tool employed. A second line 27 extending from the rear face 28, forms a portion of the split and the second line also extends parallel to the rake angle of the tool. While the invention is not so limited, it has been found desirable to have the first line 25 overlie or be in axial alignment with the second line 27. The split is completed along a third line 29 which intersects the ends of the first and second lines. The angle that the third line makes with the axis of the collet will depend upon the length of the first and second lines and, in the preferred embodiment, it will be oblique to the central axis.

The segments of the collet are held together as a single unit (to form the configuration shown in FIG. 2), by means of a plurality of resilient sections 31 which are bonded to the segments along each first and second line only. No resilient section is provided along the third lines. Front face 26 may be provided with a raised cylindrical portion 32 adapted to cooperate with central aperture 16 for alignment of the collet.

The collet is provided with an aperture therethrough, the aperture being built up from the interior surfaces of each segment. Referring to FIG. 5, it will be noted that the aperture defined by the complete collet is divided into three longitudinal sections. One section extends from the front face, one section extends from the rear face, and the third section extends between the other two. The third or central section is made up of the cylindrical arcs 33 which form a cylindrical aperture having a diameter larger than the outside diameter of tool 17 so that no contact will be made between the walls of cylindrical arcs 33 and any portions of the tool.

Viewing the section of tool 17 as shown in FIG. 3, it will be noted that an end mill is provided with cutting edges 41, lands 42, cutting faces 43 and flutes 44. Referring again to FIGS. 5, 6 and 8, the interior surfaces of the segments adjacent the front and rear faces are adapted to follow the contour of cutting faces 43 and flutes 44 and therefore must spiral at the rake angle.

As shown in FIGS. 5 and 6, the interior face of each segment is provided with a projecting surface 45, the projecting surface 45 on each segment engaging one of the flutes and the adjacent cutting face. The projecting surfaces 45 of adjacent segments join one another at a relieved portion 46 which provides a clearance so that the segments do not contact the tool along lands 42 and cutting edges 41. As may be understood, gripping of the tool along the lands and cutting edges could distort the lands and dull the cutting edges. Since, as will be evident, the tool could be gripped at any place along its axis, the gripping area for one operation may eventually become the cutting surface for another operation after the tool has been resharpened. It will also be understood that projecting surfaces 45 will be spirally developed to engage the spiral flutes. This may be seen in FIG. 6 wherein the contour shown in phantom in the center of the figure represents the orientation of the aperture at the front face, while the contour shown in full lines indicates the orientation of the aperture along the line through which FIG. 6 is taken.

Figure 8:
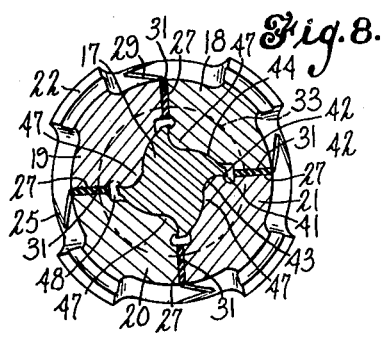
FIG. 8 is a sectional view taken along line 8—8 of FIG. 5.

Referring now to FIGS. 5 and 8, separate projecting surfaces 47 are provided adjacent the rear face on each segment and these segments are also spirally generated to engage the flutes and cutting faces of the tool. As before, the projecting surfaces of each segment join the adjacent segment and define relieved portions 48 which avoid contact with the cutting edges and lands of the tool. The projecting surfaces 45 and 47, therefore, have the same configuration but are spaced by means of the central cylindrical aperture formed by cylindrical arcs 33. While the projecting surfaces 45 and 47 on each segment may be generated along the same spiral flute, it has been found preferable to have the projecting surfaces on any particular segment be in approximate axial alignment. In this manner the projecting surfaces on each segment will engage different flutes of the tool. The distance between the front and rear projecting surfaces must be sufficient to provide for an approximate 90° rotation of the spiral flute. It should be understood, however, that the projecting surfaces on any particular segment need not be in axial alignment. Where deep cuts or high feed rates are anticipated, the axial alignment is deemed desirable, since greater resistance to axial slippage of the tool is provided.

Figure 9:
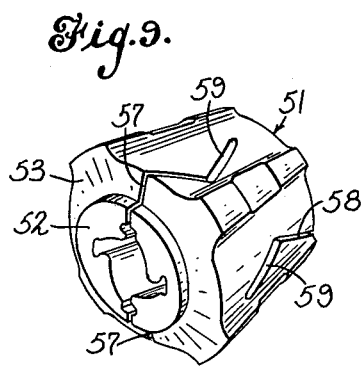
FIG. 9 is a perspective view of an alternate construction of a collet embodying the invention.
Figure 10:
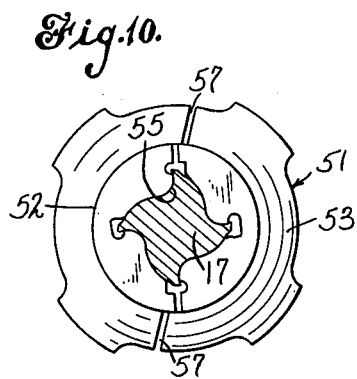
FIG. 10 is a front elevational view of the collet of FIG. 9.
Figure 11:
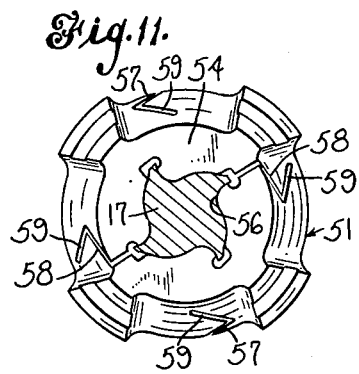
FIG. 11 is a rear elevational view of the collet of FIG. 9.

An alternate construction of the invention embodying the principles as herein set forth is shown in FIGS. 9 through 11. The main distinction between the collet of FIGS. 2 through 8 and the collet of FIGS. 9 through 11, is that the sections in the first embodiment are completely separated from one another into segments while the collet shown in the second embodiment is of a unitary construction, being divided into sections along cuts which do not completely separate the sections, as will hereinafter be described.

Referring now to FIGS. 9 through 11, a collet indicated generally at 51 has a tapered configuration and is provided with a raised cylindrical portion 52 to cooperate with the central aperture 16 in collet 15 to align the collet in sleeve 11 as shown in FIG. 1. The collet has a front face 53 and a rear face 54 and may be considered to be divided into four sections, each section having a projecting surface 55 adjacent the front face and adapted to mate with each of the flutes of tool 17, and a projecting surface 56 adjacent the rear face and adapted to mate with the flutes of the tool. As shown in FIG. 5, the collet is generally divided into three longitudinal sections with one section extending from the front face, one section extending from the rear face, and a third section extending between the other two. The third or central section is made up of cylindrical arcs having a diameter larger than the outside diameter of the tool so that no contact is made between the third section and any part of the tool.

As viewed from the front in FIG. 10, the collet is divided into two sections along first cuts 57 which extend longitudinally inwardly from the front face, preferably at the rake angle of the flutes. The first cuts 57 extending from the front face are spaced 180° from one another. As viewed from the rear in FIG. 11, the collet is divided into two sections by means of second cuts 58 extending longitudinally inwardly from the rear face at approximately the same angle as the rake of the flutes. Second cuts 58 are disposed 180° from each other and are also disposed 90° from the first cuts, thereby, in effect, dividing the collet into four sections. An oblique third cut 59 extends longitudinally inwardly toward the rear face from the termination of each of the first cuts and longitudinally inwardly toward the front face from the termination of each of the second cuts. Third cut 59 would be the equivalent of third line 29 in the embodiment shown in FIG. 2. However, in contradistinction to the embodiment shown in FIG. 2, no resilient sections are provided in the first or second cuts. In all other respects, the collet is identical to the collet described in connection with FIGS. 2 through 8, in that each section is provided with two projecting surfaces which follow the spiral of the flutes, relieved portions are provided so that the collet does not contact the cutting edges or the lands of the tool, and the like.

It should be noted that the embodiment shown in FIGS. 9 through 11 is adapted for use with a four-fluted tool and therefore the collet is preferably divided into four sections with two cuts extending from the front face and two cuts extending from the rear face. It should be understood that collets constructed in accordance with the invention may be used with any tool, and are not limited to a tool having any particular number of flutes. If the tool has an even number of flutes, then it is anticipated that half the cuts would extend from one face and the other half would extend from the other face. If the tool has an odd number of flutes, such as three, for example, then the collet would be divided generally into three 120° sections and two cuts would extend from one face and one cut from the other face. The particular configuration of the collet may be modified as long as a plurality of sections are provided, each section carrying spaced-apart bearing surfaces, and the collet being so constructed and arranged that the sections may be deflected radially inwardly with respect to one another.

The construction of the preferred embodiments herein described represents a substantial advance in the art since tools may now be successfully gripped on their flutes. By having the bearing or contact surfaces on each section spaced apart by means of the cylindrical arcs, any high spots in the flutes will not prevent both projecting surfaces on a single section from contacting the flutes. Futhermore, by providing for deflection of the sections relative to one another, other variations such as misalignment of flutes and the like, will not weaken the grip which the collet may exert on the tool. In the preferred embodiments shown for use with a four-fluted end mill, contact between all eight projecting surfaces on the collet with the tool along the flutes thereof is assured.

While the preferred embodiments also show the number of sections to be equal to the number of flutes, variations in this may be made without departing from the spirit of the invention since the primary concerns are that the projecting surfaces are axially spaced, whether aligned or otherwise, and adjacent sections may rock into the required positions to provide maximum contact of the collet with the cutting tool.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A collet for gripping, on the flutes thereof, a shankless tool having four spiral flutes, said collet comprising, four segments which, taken together, form a complete collet having the outside configuration of a tapered cylinder with a front face, a rear face and an axial passage therethrough, each segment being separated from the adjacent segment along a first line extending inwardly from the front face of the collet, a second line extending inwardly from the rear face of the collet, said first and second lines substantially overlying one another axially and extending substantially parallel to the rake angle of the flutes, and a third line extending between and intersecting said first and second lines, each segment having extending radially inwardly thereof adjacent each face, a spiral projection adapted to mate with the flutes of the tool and being relieved to prevent contact with the cutting edges of the tool, the projections being in substantial axial alignment and being spaced one from another by means of a cylindrical undercut generated on a diameter larger than the outside diameter of the tool, and resilient members bonded between adjacent segments along said first and second lines to resiliently join all segments, the overall length of said collet being such that the projections on any single segment engage the grooves of adjacent flutes.

2. A collet for gripping, on the flutes thereof, a shankless tool having a plurality of spiral flutes, said collet comprising, a plurality of segments which, taken together, form a complete collet having the outside configuration of a tapered cylinder with a front face, a rear face and an axial passage, the number of segments equalling the number of flutes on the tool, each segment being separated from the adjacent segment along a first line extending inwardly from the front face of the collet, a second line extending inwardly from the rear face of the collet, said first and second lines substantially overlying one another axially and extending substantially parallel to the rake angle of the flutes, and a third line extending between and intersecting said first and second lines, each segment having extending radially inwardly thereof adjacent each face, a spiral projection adapted to mate with the flutes of the tool and being relieved to prevent contact with the cutting edges of the tool, the projections being in substantial axial alignment and being spaced one from another by means of a cylindrical undercut generated on a diameter larger than the outside diameter of the tool, and resilient members bonded between adjacent segments along said first and second lines to resiliently join all segments, the overall length of said collet being such that the projections on any single segment engage the grooves of adjacent flutes.

3. A collet for gripping, on the flutes thereof, a shankless tool having a plurality of flutes, said collet comprising, a plurality of segments which, taken together, form a complete collet having the outside configuration of a tapered cylinder with a front face, a rear face and an axial passage, the number of segments equalling the number of flutes on the tool, each segment being separated from the adjacent segment along a first line extending obliquely inwardly from the front face of the collet, a second line extending obliquely inwardly from the rear face of the collet, and a third line extending between and intersecting said first and second lines, each segment having extending radially inwardly thereof adjacent each face, a projection adapted to mate with the flutes of the tool and being relieved to prevent contact with the cutting edges of the tool, the projections being spaced one from another by means of a cylindrical undercut generated on a diameter larger than the outside diameter of the tool, and resilient members bonded between adjacent segments along said first and second lines to resiliently join all segments.

4. A collet for gripping, on the flutes thereof, a shankless tool having a plurality of flutes, said collet comprising, a plurality of segments which, taken together, form a complete collet having a front face, a rear face and an axial passage, the number of segments equalling the number of flutes on the tool, each segment being separated from the adjacent segment along a line running from the front face to the rear face, each segment having extending radially inwardly thereof adjacent each face a projection adapted to mate with the flutes of the tool, the projections being axially spaced one from another, and spaced resilient members bonded between each pair of adjacent segments to resiliently join all segments.

5. A collet for gripping, on the flutes thereof, a shankless tool having a plurality of flutes, said collet comprising, a plurality of segments which, taken together, form a complete collet having a front face, a rear face and an axial passage, each segment being separated from the adjacent segment along a line running from the front face to the rear face, each segment having extending radially inwardly thereof adjacent each face a projection adapted to mate with the flutes of the tool and being relieved to prevent contact with the cutting edges of the tool, the projections being axially spaced one from another, and spaced resilient members bonded between each pair of adjacent segments along said lines of separation to resiliently join all segments.

6. A collet for gripping, on the flutes thereof, a shankless tool having four spiral flutes, said collet having the outside configuration of a tapered cylinder with a front face, a rear face and an axial passage therethrough, said collet having extending radially inwardly thereof adjacent each face, four spiral projections adapted to mate with the tool and being relieved to prevent contact with the cutting edges of the tool, the front projections being in substantial axial alignment with the rear projections, the front and rear projections being spaced one from another by means of a cylindrical undercut generated on a diameter larger than the outside diameter of the tool, said collet being provided with at least two front cuts spaced 180° from one another, each front cut separating an adjacent pair of front projections, at least two rear cuts spaced 180° from one another and 90° from said front cuts, said rear cuts separating an adjacent pair of rear projections, said front and rear cuts extending substantially parallel to the rake angle of the flutes, and a central cut extending into the cylindrical undercut from the termination of each of the front and rear cuts along a line oblique to the longitudinal axis of the collet.

7. A collet for gripping, on the flutes thereof, a shankless tool having a plurality of spiral flutes, said collet having the outside configuration of a tapered cylinder with a front face, a rear face and an axial passage therethrough, said collet having extending radially inwardly thereof adjacent the front face, a plurality of spiral projections, one adapted to mate with each of the flutes of the tool, and having extending radially inwardly thereof adjacent the rear face, a plurality of spiral projections, one adapted to mate with each of the flutes of the tool, said front and rear projections being relieved to prevent contact with the cutting edges of the tool, the front projections being in substantial axial alignment with the rear projections, the front and rear projections being spaced one from another by means of a cylindrical undercut generated on a diameter larger than the outside diameter of the tool, said collet being provided with at least one front cut separating an adjacent pair of front projections, at least one rear cut separating an adjacent pair of projections, said front and rear cuts being axially non-aligned and extending substantially parallel to the rake angle of the flutes, and a central cut extending into the cylindrical undercut from the termination of each of the front and rear cuts along a line oblique to the longitudinal axis of the collet.

8. A collet for gripping, on the flutes thereof, a shankless tool having a plurality of flutes, said collet having a front face, a rear face and an axial passage therethrough, said collet having extending radially inwardly thereof adjacent the front face, a plurality of projections adapted to mate with the flutes of the tool, and having extending radially inwardly thereof adjacent the rear face, a plurality of projections adapted to mate with the flutes of the tool, the number of front and rear projections each being equal to the number of flutes on the tool, the front and rear projections being spaced one from another by means of a cylindrical undercut generated on a diameter larger than the outside diameter of the tool, said collet being provided with at least one front cut separating an adjacent pair of front projections, at least one rear cut separating an adjacent pair of rear projections, said front and rear cuts being axially non-aligned, and a central cut extending into the cylindrical undercut from the termination of each of the front and rear cuts along a line oblique to the longitudinal axis of the collet.

9. A collet for gripping, on the flutes thereof, a shankless tool having a plurality of flutes, said collet having a front face, a rear face and an axial passage therethrough, said collet having extending radially inwardly thereof adjacent the front face, a plurality of projections adapted to mate with the flutes of the tool, and having extending radially inwardly thereof adjacent the rear face, a plurality of projections adapted to mate with the flutes of the tool, the front and rear projections being spaced one from another by means of a cylindrical undercut generated on a diameter larger than the outside diameter of the tool, said collet being provided with at least one front cut separating an adjacent pair of front projections, at least one rear cut separating an adjacent pair of rear projections, said front and rear cuts being axially non-aligned, and a central cut extending into the cylindrical undercut from the termination of each of the front and rear cuts along a line oblique to the longitudinal axis of the collet.

10. A collet for gripping, on the flutes thereof, a shankless tool having a plurality of flutes, said collet having a front face, a rear face and an axial passage therethrough, said collet having extending radially inwardly thereof adjacent the front face, at least one projection adapted to mate with a flute of the tool, and having extending radially inward thereof adjacent the rear face, at least one projection adapted to mate with a flute of the tool, the front and rear projections being spaced one from another by means of a cylindrical undercut generated on a diameter larger than the outside diameter of the tool, said collet being provided with at least one front cut extending longitudinally from the front face thereof, at least one rear cut extending longitudinally from the rear face thereof, said front and rear cuts being axially non-aligned, and a central cut extending into the cylindrical undercut from the termination of each of the front and rear cuts along a line oblique to the longitudinal axis of the collet.

References Cited in the file of this patent

UNITED STATES PATENTS

| 1,930,261 | Berry | Oct. 10, 1933 |
| 2,466,129 | Stoner | Apr. 5, 1949 |
| 2,746,758 | Stoner | May 22, 1956 |
| 2,816,768 | Stoner | Dec. 17, 1957 |